Figures 3, 3A:
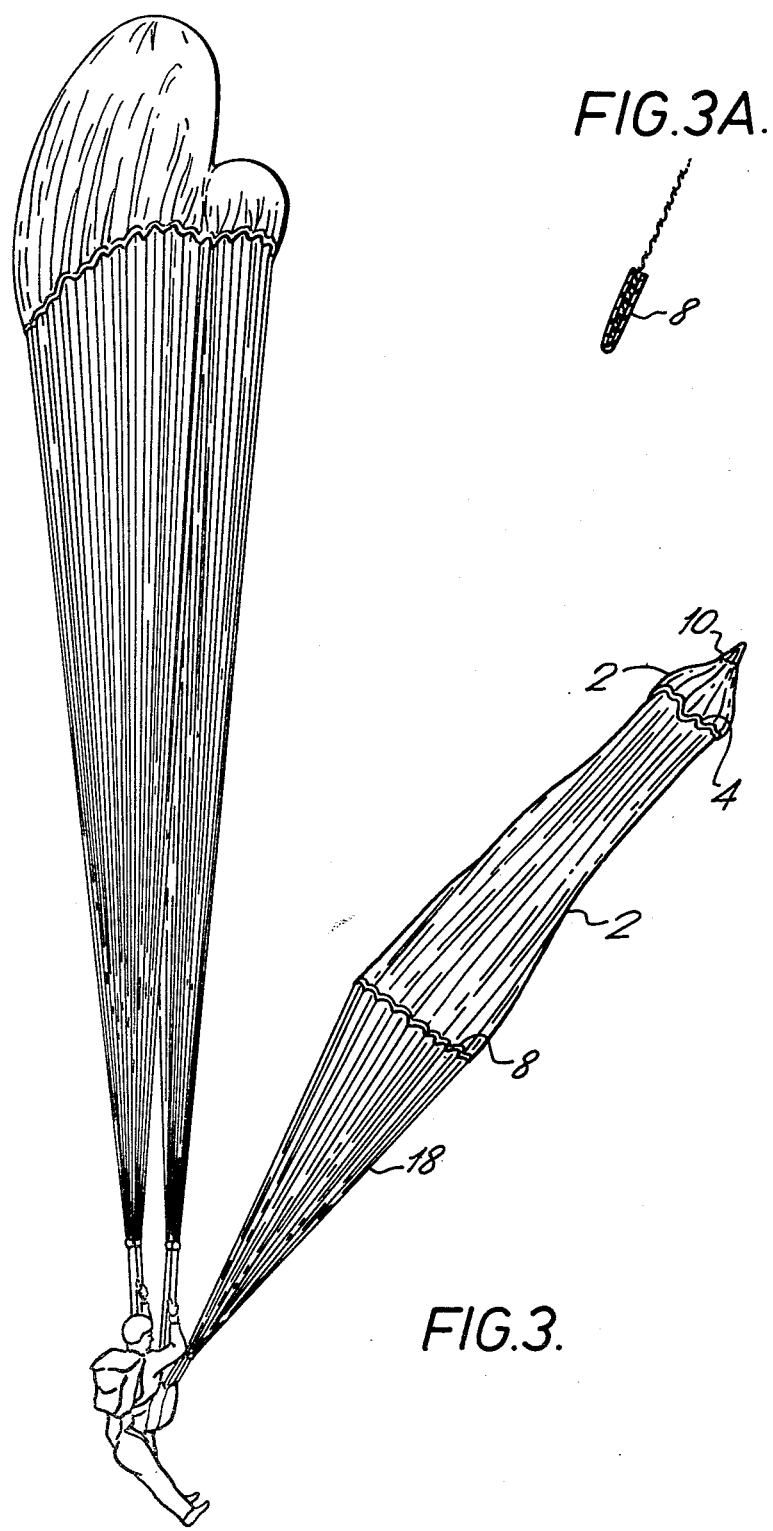

United States Patent [19]

Birch et al.

[11] Patent Number: 4,467,986
[45] Date of Patent: Aug. 28, 1984

[54] RESERVE PARACHUTES

[76] Inventors: Stanley A. Birch; Sidney B. Jackson, both of c/o Irvin Great Britain Limited, Icknield Way, Letchworth, Hertfordshire, England; Eric J. F. Edmonds, c/o PQ Division N.A.M.M.A. Arabella Strasse 16,8, Munich 36, Fed. Rep. of Germany; Robert V. Gigg; Norman L. Haggert, both of c/o ADAES, A & AEE, Boscombe Down, Wilshire, England

[21] Appl. No.: 298,690

[22] Filed: Sep. 2, 1981

Related U.S. Application Data

[63] Continuation of Ser. No. 043,566, May 29, 1979, abandoned, which is a continuation of Ser. No. 860,417, Dec. 13, 1977, abandoned.

[30] Foreign Application Priority Data

Dec. 15, 1976 [GB] United Kingdom ............... 52361/76

[51] Int. Cl.³ ...................... B64D 17/38; B64D 17/62
[52] U.S. Cl. .................................. 244/147; 244/148; 244/149; 244/152
[58] Field of Search ............... 244/142, 145, 146, 147, 244/148, 149, 152

[56] References Cited

U.S. PATENT DOCUMENTS

| 1,498,780 | 6/1924 | Broadwick | 244/145 |
|---|---|---|---|
| 1,618,009 | 2/1927 | Holt | 244/149 |
| 1,854,996 | 4/1932 | Palagonia | 244/149 |
| 1,890,868 | 12/1932 | Simpson et al. | 244/149 |
| 1,988,872 | 1/1935 | Knight | 244/148 |
| 2,316,895 | 4/1943 | Smith | 244/149 |
| 2,498,505 | 2/1950 | Quilter | 244/148 |
| 3,429,532 | 2/1969 | Sepp | 244/149 |
| 3,433,441 | 3/1969 | Cummings | 244/152 |
| 3,765,627 | 10/1973 | Snyder | 244/147 |
| 3,837,604 | 9/1974 | Matsuo | 244/152 |

Primary Examiner—Charles E. Frankfort
Attorney, Agent, or Firm—Beveridge, DeGrandi & Kline

[57] ABSTRACT

A reserve parachute for deployment under low descent speeds includes a rubber ring packed with the canopy and rigging lines and attached to the canopy in the region of the canopy apex and being disposed concentric with respect to a vent hem of the canopy. Upon deployment the ring expands to increase profile drag to ensure the canopy mouth faces substantially downwardly during deployment. The peripheral hem of the canopy at the canopy mouth is stiffened with a tape loop treated with polyurethane so that the peripheral hem springs apart upon deployment. An inhibitor tie is attached to a loop of the folded rigging lines within the pack to permit only a part of the rigging to be released initially; the inhibitor tie breaks at a predetermined tension in the lines to permit the remainder of the rigging lines to be released and to permit fully canopy deployment.

12 Claims, 11 Drawing Figures

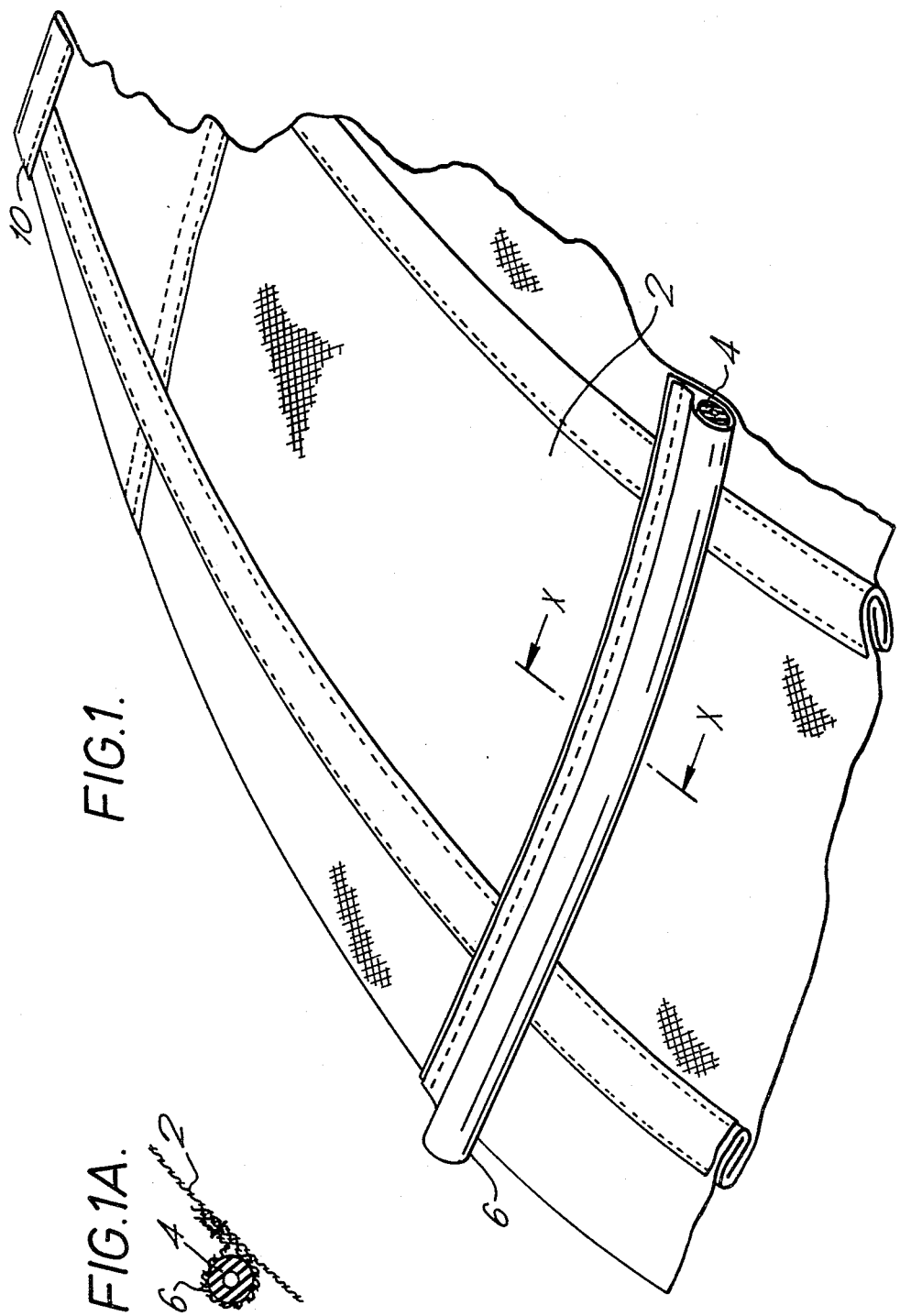

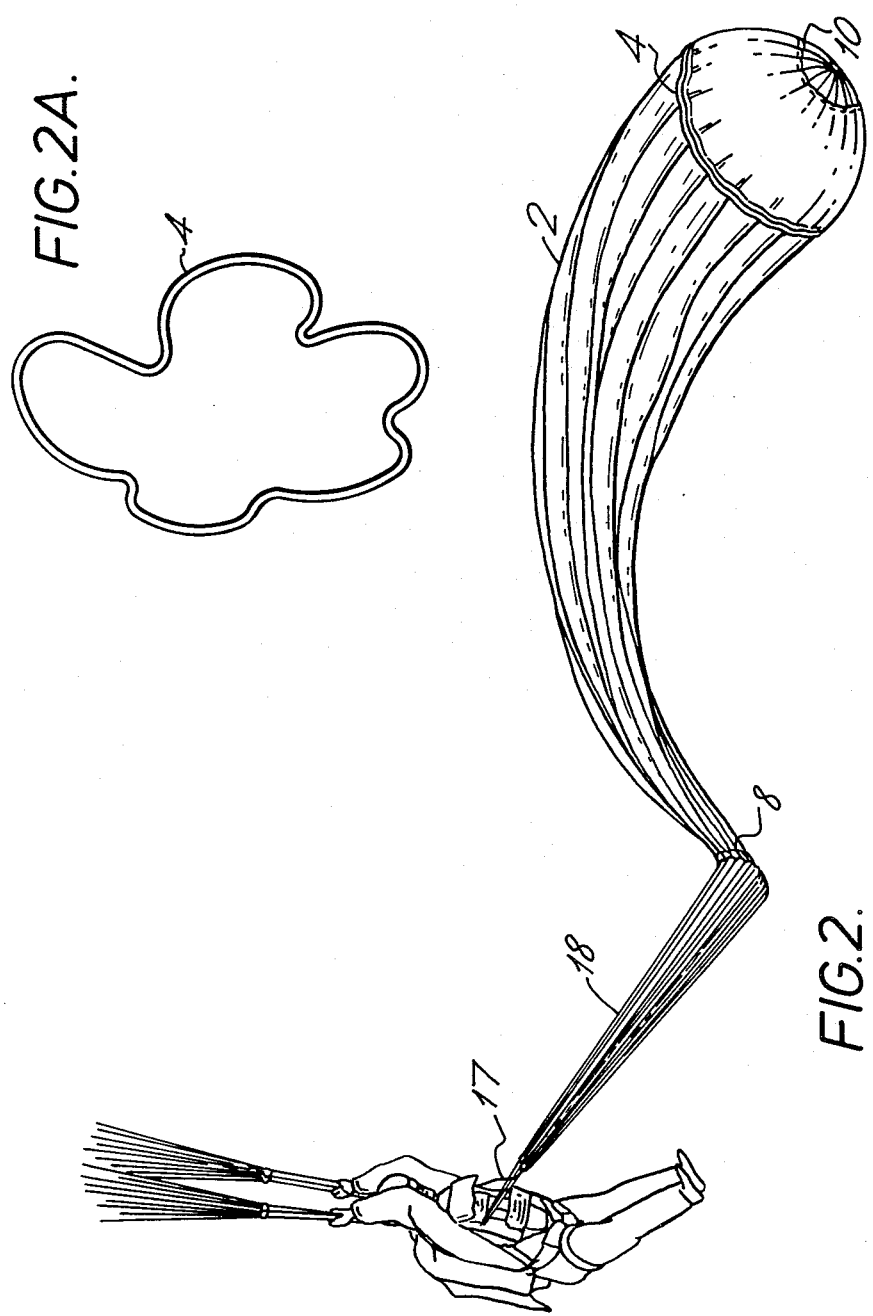

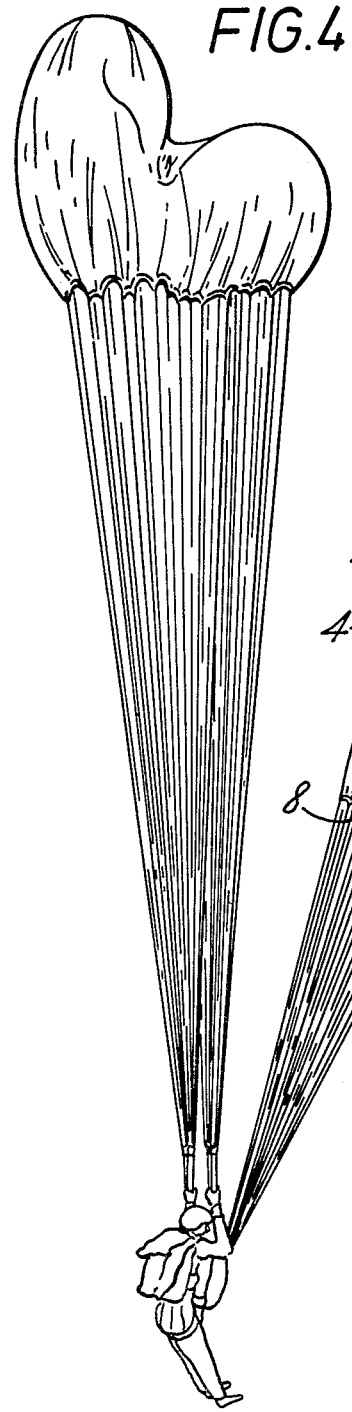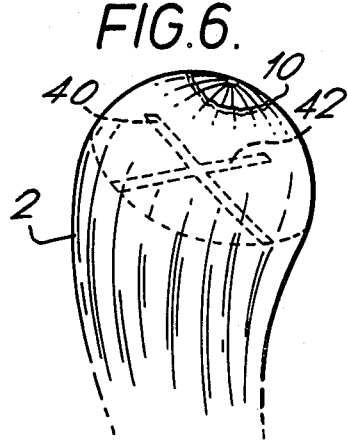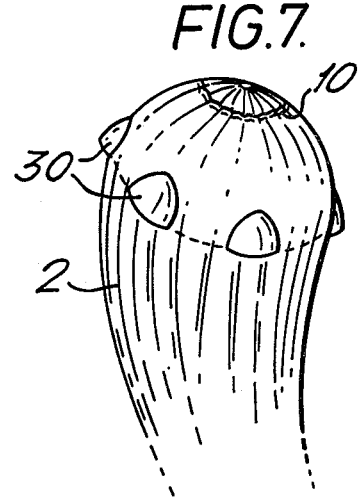

RESERVE PARACHUTES

This is a continuation of application Ser. No. 043,566 filed May 29, 1979, which is a continuation of application Ser. No. 860,417, filed Dec. 13, 1977, both now abandoned.

The present invention relates to reserve parachutes, for example, of the type used by paratroopers.

Paratroopers generally carry a reserve parachute in a pack attached to their chest which is deployed by hand if the main parachute fails to open fully or is damaged. Such reserve parachutes are designed for use when the descent rate of the paratrooper prior to deployment is high and in such circumstances have been found to inflate very reliably. However, the paratrooper will often deploy a reserve parachute when due to a malfunction of the main parachute the rate of descent of the paratrooper is low, for example below 30 feet per second. In this situation there is little dynamic pressure available to assist in the correct deployment and development of the reserve parachute and the reserve parachute can drop to its full extent below the paratrooper and can then become entangled with the paratrooper or with the rigging of the main parachute causing both the reserve and the main parachutes to fail completely.

In order to facilitate correct deployment of the reserve parachute when initiated under low speed conditions forcible deployment has been considered. There are several ways of achieving such forcible deployment but all of these require sophisticated equipment which is of course expensive. For example, a known reserve parachute incorporates a small lightweight pilot parachute which is forcibly ejected into a clean air by a gun operated by blank cartridges, the drag exerted by the pilot parachute usually being sufficient to deploy the reserve parachute correctly.

Accordingly it is an object of the present invention to provide a reserve parachute which does not rely on forcible deployment but which can be deployed without risk under low speed conditions.

It is a further object of the present invention to provide a reserve parachute including means for facilitating deployment and serving to increase the drag profile upon deployment to cause the mouth of the canopy to face downwardly during deployment.

It is a further object of the present invention to provide a reserve parachute having a strengthened and resilient hem to facilitate inflation of the canopy upon deployment of the canopy.

It is a further object of the invention to provide a reserve parachute wherein only part of the rigging lines is released initially to facilitate canopy deployment and subsequently the remainder of the rigging lines is released to permit full canopy deployment.

According to a first aspect of the present invention there is provided a reserve parachute comprising means adapted and arranged to be packed with the canopy in a pack and to expand upon deployment of the parachute thereby to expand the area in the region of the apex of the canopy so as to produce a sufficient profile drag of the canopy whereby to cause the mouth of the canopy to face substantially downwardly during deployment.

Preferably, said means is resilient and is attached to said apex area of the canopy to be folded with the canopy in the pack, the resilient means being adapted to expand to its unfolded position upon deployment to thereby increase the apex area of the canopy.

In one embodiment, said resilient means comprises a ring of resilient material attached to said canopy substantially concentrically with respect to the vent hem thereof. The ring is preferably made of a thick-walled tube of rubber or plastics material. The material of the ring is flexible enough to allow the canopy to be packed in the normal manner. When the reserve parachute is deployed by hand in a substantially horizontal direction the ring expands to assume its normal, circular unfolded shape and in so doing spreads the material at the apex area of the canopy. This increases the profile drag of the canopy, particularly at the apex area thereof, and if this increase in profile drag is greater than the weight of the ring, there will be a net increase in the profile drag ensuring that the mouth of the canopy faces substantially downwardly thereby allowing air to enter the mouth of the canopy to inflate the canopy.

The ring of resilient material may be either integral or sectioned and it can be permanently or detachably attached to the canopy.

Alternatively, the resilient means may comprise a non-annular resilient member attached to the canopy proximate the vent hem thereof. For example, the resilient member could be in the shape of a cruciform and made of resilient sheet material or could comprise an arrangement of springs and/or spring mounted levers. In a further embodiment scoops or pockets may be attached to the exterior of the canopy proximate the vent hem, the scoops preferably being biassed open. Upon deployment of the parachute the scoops would be inflated and would thus act to increase the area of the apex of the canopy.

According to a second aspect of the present invention there is provided a reserve parachute including means adapted and arranged such that upon deployment of the canopy the peripheral hem of the canopy tends to spring apart and thus facilitate inflation of the canopy.

Preferably said means comprises said peripheral hem on the canopy which is stiffened to render the hem resilient whereby upon deployment of the parachute the hem tends to spring apart and thus facilitates inflation of the canopy; alternatively said means may comprise a separate member attached to the canopy adjacent to the peripheral hem.

Preferably the peripheral hem is stiffened by treating the material thereof with polyurethane or other suitable plastics material having the required degree of resilience. In addition, the hem may be made of double thickness.

In a preferred embodiment of reserve parachute according to the first aspect of the invention, a peripheral hem is provided on the canopy which is stiffened to render the hem resilient whereby upon deployment of the parachute the hem tends to spring apart and thus facilitate inflation of the canopy.

According to a further aspect of the present invention there is provided a reserve parachute including means attached to a selected point along the rigging lines of the parachute which means is such as to allow only a part of the rigging lines to be deployed initially thereby to prevent the canopy and rigging lines falling the full length of the lines below the reserve parachute pack upon initial deployment at low descent speeds, and to release the remaining part of the rigging lines for full deployment when canopy deployment has commenced.

Preferably said means attached to a selected point along the rigging lines comprises an inhibitor tie having a predetermined breaking strength; alternatively said means may comprise cooperating portions of Velcro (RTM) tape.

The position for the tie along the rigging lines is so selected that the parachute can inflate readily and consistent with reduced length lines. In one embodiment the tie has a breaking strength of the order of 40 lb. and is made between a becket on the pack and a fold of the gathered rigging lines. The strength of the tie is dependent upon the weight and the drag of the parachute used.

In a preferred embodiment a reserve parachute according to the first and/or the second aspect of the invention is provided with an inhibitor tie between the pack of the reserve parachute and a selected point along the rigging lines thereof.

Figure 5:
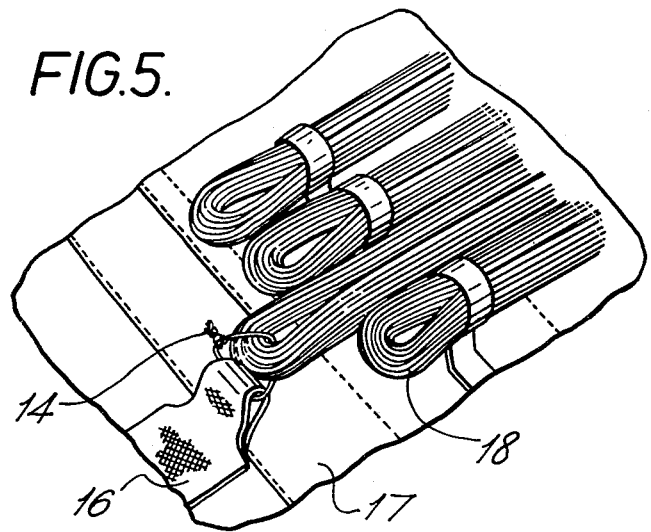
Figure 5A:
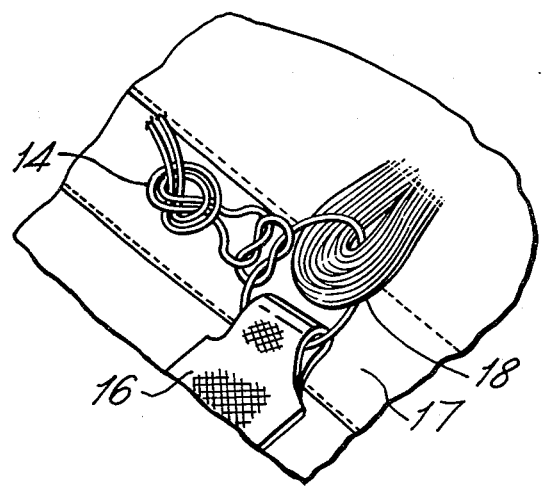

Embodiments of the present invention will hereinafter be described, by way of example, with reference to the accompanying drawings, in which:

FIG. 1 shows part of the canopy of a reserve parachute having a rubber ring attached thereto, FIG. 1A shows a section along the line X—X of FIG. 1 showing the attachment of the rubber ring to the canopy, FIG. 2 shows diagramatically the intial stage in the deployment of a reserve parachute including a rubber ring as indicated in FIGS. 1 and 1A, FIG. 2A shows the shape attained by the rubber ring at the stage indicated in FIG. 2, FIGS. 3 and 4 show progressively later stages in the deployment of the parachute of FIG. 2, FIG. 3A is a cross-sectional view of the peripheral hem of the canopy, FIG. 5 shows rigging lines folded in the pack and an inhibitor tie thereof, FIG. 5A is a more detailed showing of the inhibitor of FIG. 5, and FIGS. 6 and 7 are schematic views of other means disposed in the region of the canopy apex and serve as substitutes for the rubber ring of FIG. 1 to expand the apex area.

FIG. 1 shows part of the canopy 2 of a reserve parachute. This parachute may be of any suitable design. As indicated in FIG. 1 a ring 4 is attached to the exterior of the canopy 2 to extend therearound. The ring 4 is substantially concentric with the vent hem 10 of the canopy 2 and is closer to the vent hem than to the peripheral hem 8 (FIG. 2) of the canopy 2.

In the embodiment illustrated the ring 4 is spaced approximately 2 ft 6 in from the vent hem of the canopy 2 and has a diameter of approximately 6 ft.

The ring 4 is made from a resilient, flexible material such as rubber or plastics material. In a preferred embodiment the ring 4 is constructed from a thick-walled rubber tube, having an external diameter of between 0.337 and 0.343 inches and an internal diameter of between 0.123 and 0.135 inches.

The attachment of the ring 4 to the canopy 2 is shown in FIG. 1A. A length of tape 6 is folded transversely to enclose the ring 4 and the two free ends of the tape are then stitched to the external surface of the canopy 2.

Once the ring 4 has been attached to the parachute the canopy with the attached ring and the rigging are packed in substantially the normal manner. The flexibility of the ring enables it to be folded between each section of the folded canopy.

The peripheral hem 8 of the canopy 2 of the reserve parachute shown in the drawings is stiffened as shown in FIG. 3A so that it is resilient and thus tends to spring apart upon deployment. The hem 8 is preferably made in the conventional manner and is stiffened in any suitable way. In a preferred embodiment a length 9 of nylon tape 1" in width is stiffened by treating it with a polyurethane solution. The degree of stiffening of the tape is such that a length thereof of at least 18 inch does not collapse under its own weight when held out horizontally. The stiffened tape is then stitched around the peripheral hem. Preferably as shown in FIG. 3A a double thickness of the stiffened tape is secured to the peripheral hem.

In use the paratrooper connects a pack 17 containing the reserve parachute so far described onto his chest. If, during his descent, the paratrooper wishes to employ his reserve he opens the pack 17 and projects the parachute by hand, preferably horizontally or slightly upwardly so that the canopy 2 and rigging lines 18 are stretched out in a straight line in order to catch the small amount of air pressure available to its best advantage. A mechanical method of deploying the parachute by means of springs or similar devices which eject the canopy may be employed if required. As the canopy is projected the ring 4, due to its resilience, will expand from its folded position to attain a shape somewhat as indicated in FIGS. 2 and 2A. The area of the ring 4 will thus increase and in doing so will tend to expand the area of the canopy 2 in the region of the apex thereof. This increase in the apex area of the canopy will produce an increase in the profile drag of the parachute and will assist the parachute to rise above the paratrooper and will position the mouth of the canopy defined by the peripheral hem 8 to face substantially downwardly. It has been found that a rubber ring of about 6 ft in diameter will produce a drag of the order of ½ pound at 20 ft per second. Thus, so long as the weight of the rubber ring 4 is negligible compared with this increased drag the canopy will tend to lift relative to the paratrooper so that the mouth faces downwardly. It will be appreciated that if the mouth faces downwardly air may enter into the canopy 2 of the parachute to assist in its inflation.

In addition, upon deployment the stiffened peripheral hem 8 will tend to spring apart to thereby enable more air to enter the canopy 2 and thus to aid in the inflation of the parachute.

FIG. 3 shows the parachute of FIG. 2 at a later stage in its deployment, and as can be seen from FIG. 3 the apex area 12 of the canopy is raised above the peripheral hem 8. In addition, the peripheral hem 8 has begun to spring apart whereby air will enter the canopy 2 to inflate it.

FIG. 4 shows the parachute at a later stage than FIG. 3 and it will be seen that the ring 4 has returned to its circular shape and that the canopy 2 will now begin to fully inflate.

Referring to FIG. 5, the rigging lines 18 are folded within the pack 17 into loops.

An inhibitor tie 14 is attached between a becket 16 attached to the parachute pack 17 and a loop in the folded rigging lines 18. The inhibitor tie 14 is attached to the rigging lines 18 at a selected point along the length thereof. Thus, when the reserve parachute is employed only the part of the rigging lines between the tie 14 and the peripheral hem can initially be projected from the pack. This ensures that the canopy and the rigging lines do not become entangled or fall to the full extend of the rigging lines (including any extension straps) below the level of the paratrooper. Once the drag on the canopy exceeds a predetermined value the inhibitor tie breaks, the remainder of the rigging is then pulled out of the pack and the canopy becomes fully deployed. The inhibitor tie is arranged to break at the stage shown by FIG. 4.

In an embodiment, the tie is made from a double length of No. 18 linen thread to give a tie strength of about 40 lb. It has been found that in a reserve parachute in which the total length of the rigging lines from the pack to the peripheral hem is substantially equal to the diameter of the canopy when laid flat up to about half the length of the rigging lines can be retained in the pack without the ability of the canopy to inflate being significantly impaired. In a preferred embodiment, the inhibitor tie is positioned to allow a 12 ft length of rigging lines to be initially deployed from the pack.

It has been found that if a reverse parachute is provided with the three features described above, that is the ring 4, the stiffened peripheral hem 8 and the inhibitor tie, the resultant reserve parachute is always reliably inflated, even if it is deployed when the descent rate of the paratrooper is relatively low, for example, 20 ft/sec. However, in some applications it will be sufficient to provide either the ring 4 or the stiffened hem 8 or the inhibitor tie alone.

The ring 4 described above acts to increase the net profile drag at the apex of the canopy as it springs out to its unfolded shape. The ring could obviously be made of any material having sufficient flexibility to enable it to be folded into the pack and sufficient resilience to ensure that it did spring out upon deployment. In the embodiment described above the ring 4 is attached to the exterior of the canopy but it can be attached to the interior thereof if required. The ring may be permanently or removably attached to the canopy. Of course the diameter of the ring and its distance from the vent hem can be chosen as required.

The ring could also be replaced by alternative means adapted to increase the apex area, for example, a sectioned ring could be provided or springs and/or spring mounted lever could be employed. Alternatively scoops, that is, pockets, could be stitched on the exterior of the canopy proximate the vent hem. This is shown by the arrangement shown in FIG. 7, wherein scoops 30 are disposed proximate to the vent hem 10. Preferably four scoops could be provided. It will be seen that upon deployment of the parachute the scoops are inflated and thus expand and tend to increase the apex area of the canopy.

The apex area of the canopy could also be increased by way of an annular spring. If required, the annular spring could also have a circular membrane. Alternatively, as shown in the arrangement shown in FIG. 6 a cruciform member formed by two resilient members 40,42 (e.g. cylindrical springs) arranged at an angle with respect to one another are supported in the apex area of the canopy 2 proximate to the vent hem 10. It would also be possible to employ a flat sheet or ring of a resilient polyurethane or melded foam to increase the apex area of the canopy.

Each of the resilient means described above would preferably be attached to the canopy, either permanently or detachably. However, if required, the resilient means could be unattached and inserted into the canopy during packing.

What is claimed is:

1. In a reserve parachute for deployment at low speeds of descent and including a reserve parachute pack, a main reserve canopy, and rigging lines attached to said canopy, said canopy and rigging lines being packed within said reserve parachute pack for deployment therefrom; said main reserve canopy including an apex, an apex area, a skirt defining a canopy mouth, and expander means for expanding a portion of said canopy; and restraint means attached to said reserve parachute pack and to a selected point along said rigging lines for allowing only a given length of rigging lines to said selected point to be deployed initially, said expander means providing an induced initial canopy deployment at said low speeds of descent having a drag profile with a greater drag action on said apex area of said canopy than that acting on said skirt, said restraint means operatively interacting with said expander means to facilitate said induced initial canopy deployment and said expander means enabling use of said restraint means in a reserve parachute, and said restraint means being operative after said induced initial canopy deployment to release the remainder of said rigging lines for full parachute deployment.

2. A reserve parachute as specified in claim 1 and wherein said expander means is operative for expanding said apex area of said canopy to provide an induced initial canopy development having a drag profile such as to cause the mouth of said canopy to face substantially downwardly during deployment at said low descent speeds.

3. A reserve parachute as specified in claim 1 and wherein said expander means is operative for expanding said apex area of said canopy to provide an induced initial canopy development having a drag profile such that the drag/weight ratio acting on said apex area of said canopy is greater than the drag/weight ratio acting on said skirt at said low descent speeds.

4. A reserve parachute as specified in claim 1 and wherein said expander means is operative for expanding said apex area of said canopy while said skirt thereof remains partially closed.

5. A reserve parachute as specified in claim 1 and wherein said canopy includes a stiffened peripheral hem, said stiffened peripheral hem being foldable on packing of said canopy within said pack and reboundable to spring apart and incrementally open said mouth of said canopy to facilitate inflation of said canopy.

6. A reserve parachute as specified in claim 5 and wherein the stiffening means of said stiffened peripheral hem comprises a tape loop included therewithin.

7. A reserve parachute as specified in claim 6 and wherein said tape loop is treated with a resilient plastics material.

8. A reserve parachute as specified in claim 4 and wherein said expander means is non-annular.

9. A reserve parachute as specified in claim 3 and wherein said expander means comprises resilient ring means for expanding said apex area of said canopy.

10. A reserve parachute as specified in claim 9 and wherein said canopy includes a vent hem adjacent to said apex and said resilient ring means is disposed concentrically with respect to said vent hem.

11. A reserve parachute as specified in either of claims 1, 2, 3, 4, 5, 6, 7, 8, 9, or 10, and wherein said restraint means comprises an inhibitor tie arranged to break at a predetermined tension in said rigging lines.

12. A reserve parachute as specified in either of claims 1, 2, 3, 4, 5, 6, 7, 8, 9, or 10 and wherein said reserve parachute pack has a becket attached thereto and wherein said rigging lines are folded in loops within said pack, and said restraint means is attached between said becket and a loop of said rigging lines.

* * * * *